Aug. 28, 1962
A. J. STEPHENSON
3,051,444
DEVICE FOR INSTALLING SPLIT COUPLING
COLLARS ON CORRUGATED PIPE
Filed Aug. 10, 1959
2 Sheets-Sheet 1
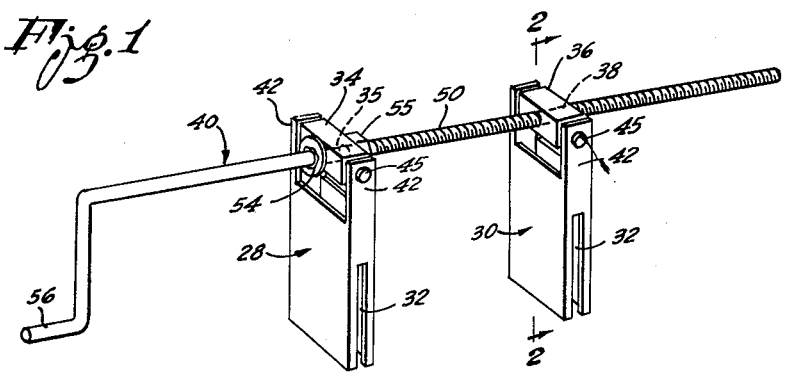
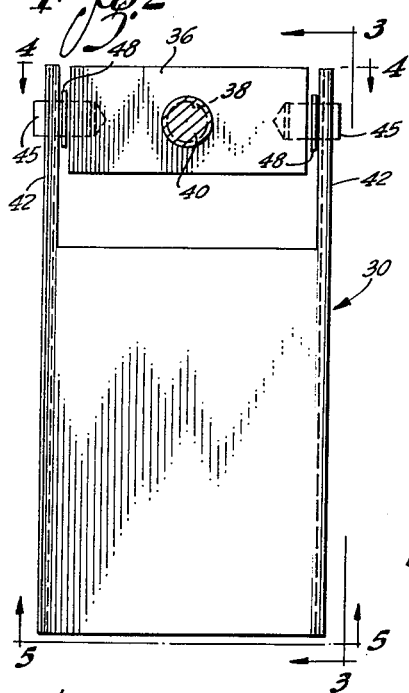
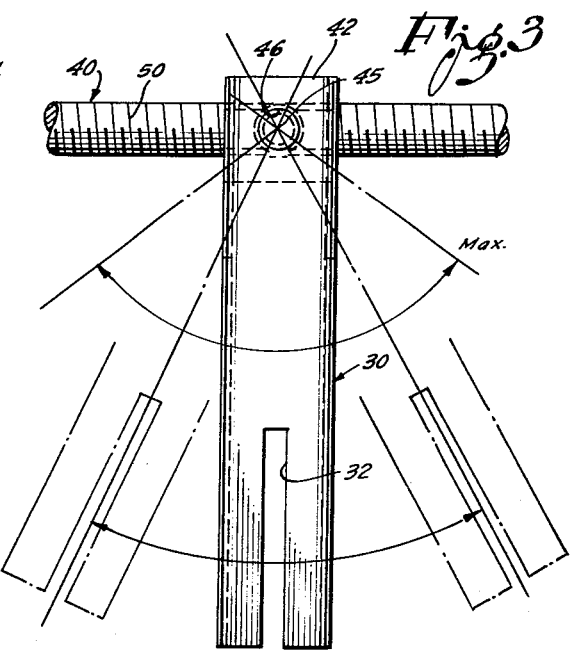
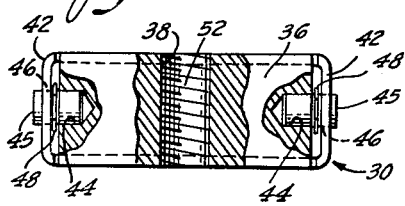
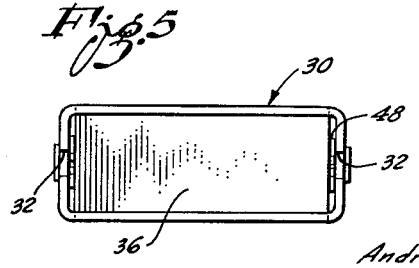
INVENTOR:
Andrew J. Stephenson
By Smyth, Roston
Attorneys

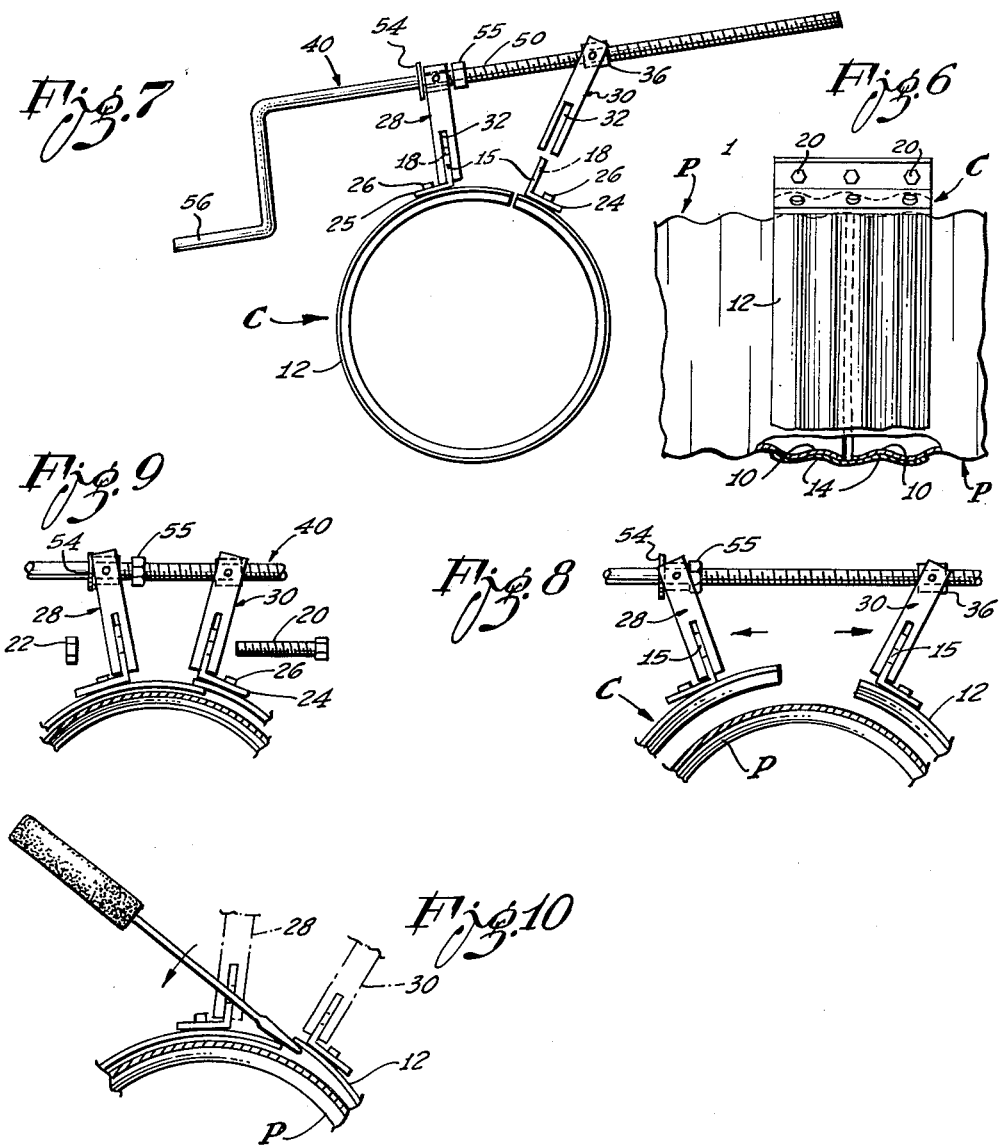

United States Patent Office 3,051,444
Patented Aug. 28, 1962

3,051,444
DEVICE FOR INSTALLING SPLIT COUPLING
COLLARS ON CORRUGATED PIPE
Andrew J. Stephenson, 13231 S. Hoover, Gardena, Calif.
Filed Aug. 10, 1959, Ser. No. 832,605
5 Claims. (Cl. 254—67)

This invention relates to a device for installing split collars to couple together sections of corrugated sheet metal pipe.

Galvanized corrugated sheet metal pipes of various diameters are used in large quantities for various purposes. One of the major uses is to form culverts under highways. With large scale construction of freeways in progress in all parts of the country, crews are continuously at work installing corrugated pipe culverts. In many instances, such a culvert is over one hundred feet long and requires the joining together of many sections of corrugated pipe.

A split coupling collar for joining the confronting ends of two sections of corrugated pipe has circumferential corrugations to nest into the corrugations at the ends of the pipe sections so that the installed and tightened coupling collar holds the two pipe sections together in a positive manner. To permit the collar to be tightened permanently, the two ends of the split band that form the collar are provided with longitudinal radial flanges and the two flanges are apertured to receive suitable tightening bolts.

For good reasons, the split coupling collar is biased to assume a diameter that is intermediate its final tightened diameter and the larger diameter that is required for the coupling collar to pass over a corrugated pipe end. Consequently, the installation of a split coupling collar involves two operations. The first operation is the spreading of the collar to a diameter substantially larger than its unrestrained or unstressed diameter to clear the end corrugations of the two sections of pipe. The second and subsequent operation is to contract the split collar to a final diameter substantially smaller than its unrestrained diameter to join the two pipe sections together in a rigid and inseparable manner.

Since a split collar is made of heavy gauge metal, it would offer substantial resistance to the flexure that is required for spreading and contracting the collar even if the collar were not corrugated. It may be readily appreciated that the corrugations of the collar raise the resistance to flexure to relative high magnitude. It is exceedingly difficult for a workman, even with the assistance of a helper, to apply the necessary spreading force by manually grasping the two radial flanges of the split collar and, moreover, it is hazardous to do so. It is also difficult to contract the collar sufficiently to receive the bolts for the final tightening action and especially so since one of the split ends of the collar must usually be pried outward to slip over the other end for completing the tightening operation.

A manually operable tool to spread or contract such a split collar should meet certain requirements. One requirement is that the tool be a time-saver. It must be adapted for quickly engaging and releasing the split collar and for rapidly carrying out the spreading and contracting operations. Another requirement is that the tool be easy to operate. It should be operable with only one hand to leave the other hand free. The free hand may be required, for example, to pry up one of the two ends of the split collar to overlap the other end in the tightening operation. A further requirement is that the device be irreversible in the sense of maintaining any given adjustment without yielding to the spring force exerted by the stressed collar. A still further requirement is that the device be of simple, rugged and inexpensive construction.

To meet these requirements, the present invention provides a pair of elongated members to engage the two radial flanges, respectively, of a split collar. Each of the two members has a deep transverse slot at one end to receive and straddle the corresponding radial flange of the split collar. The other or outer end of each of the elongated members hingedly carries a body with a bore therethrough, the two bores of the two bodies being in axial alignment. A manually operable screw means extends through the two aligned bores in screw-threaded engagement with at least one of the bores.

The screw means is rotatable in one direction to move the pair of elongated members away from each other by screw action and is rotatable in the opposite direction to draw the two elongated members towards each other. In the present embodiment of the invention, the screw means is formed with a crank at one end for manual operation and is journaled in one of the two aligned bores to rotate therein without axial movement relative thereto.

The features and advantages of the invention may be understood by reference to the following detailed description and the accompanying drawings.

In the drawings, which are to be regarded as merely illustrative:

FIG. 1 is a perspective view of the present embodiment of the invention;

FIG. 2 is an elevational view of one of the two elongated members as seen along the line 2—2 of FIG. 1;

FIG. 3 is an elevational view of the same elongated member as seen along the line 3—3 of FIG. 2;

FIG. 4 is a view of the upper end of the same elongated member as seen along the line 4—4 of FIG. 2, parts of the structure being broken away;

FIG. 5 is a bottom view of the same elonagted member as seen along the line 5—5 of FIG. 2;

FIG. 6 is a side elevation partly in section showing a completely installed and tightened collar joining together the confronting ends of a pair of corrugated pipe sections;

FIG. 7 is a side elevation of a split collar at its unrestrained diameter, the view showing how the tool of the present invention may be engaged with the two radial flanges of the collar;

FIG. 8 is a view partly in section and partly in side elevation illustrating the manner in which the tool of the invention is employed to expand the split collar to a sufficiently large diameter for the split collar to pass onto the ends of the two pipe sections that are to be joined together;

FIG. 9 is a similar view showing how the tool is employed for the final tightening operation; and FIG. 10 is a similar view showing how a screw driver may be used in the course of the tightening operation to pry up one of the split collar ends to cause the two ends overlap.

The manner in which the split collar is constructed and used may be understood by reference to FIGS. 6 and 7. The split collar, which is generally designated C, is employed to interconnect the confronting ends of two sections of corrugated sheet metal pipe, each of which is designated P. Each of the two sections of pipe P is formed with two corrugations, there being a valley 10 of a corrugation immediately adjacent the end of each.

The collar C comprises a split band 12 which is corrugated circumferentially to conform to the corrugations of the two pipe sections. Thus the split band 12 is formed with two corrugation valleys 14 to nest into the corresponding corrugation valleys 10 of the two pipe sections. It is apparent that when such a split band is tightened around the ends of the two pipe sections in the manner indicated in FIG. 6, the split band engages each of the pipe sections in a positive manner to make an inseparable joint.

Each of the two ends of the split band 12 is provided with a longitudinal radial flange 15 which is provided with apertures 18 to receive bolts and nuts for tightening the collar. FIG. 9 shows a bolt 20 and a cooperating nut 22 for this purpose.

The two longitudinal radial flanges 15 may be provided by mounting angle irons 24 and 25 on the split band adjacent its ends. The two angle irons may be secured to the split band in any suitable manner, for example, by means of rivets 26. It is to be noted that the angle iron 24 is close to the corresponding end of the split band 12 but the angle iron 25 is spaced away from the other end of the split band. This arrangement makes it possible for the two split ends to overlap in the tightening operation in the manner shown in FIG. 9.

As heretofore stated, the unrestrained or unstressed diameter of the split band 12 is greater than the diameter to which the split band must be tightened for interconnecting the two pipe sections and is less than the diameter to which the split band must be expanded to slip onto the confronting ends of the two pipe sections. The unrestrained or unstressed diameter of the split band may be, for example, as shown in FIG. 7, there being a gap between the two ends.

As best shown in FIG. 1, the principal parts of the selected embodiment of the invention include: two elongated engagement means 28 and 30 having longitudinal slots 32 at their inner ends to receive and straddle the respective flanges 15 of the split collar; a member 34 pivotally or hingedly mounted on the outer end of the engagement means 28, which member has a bore 35 therethrough perpendicular to its pivotal axis; a member 36 pivotally mounted in the outer end of the engagement means 30 and having a similar bore 38 therethrough (FIG. 2) perpendicular to its pivotal axis; and a manually operable screw means 40 that extends through the two bores 35 and 38 for operatively interconnecting the two engagement means 28 and 30.

Each of the two members 34 and 36 of the two engagement means 28 and 30, respectively, is mounted between a pair of parallel portions or ears 42 of the engagement means. In the present embodiment of the invention each of the pivoted members 34 and 36 is in a form of a metal block that is provided with blind axial bores 44 at its opposite ends to receive trunnion pins 45. The trunnion pins 45 extend through bores 46 in the ears 42 and extend into the blind bores 44. Each of the trunnion pins 45 is circumferentially grooved to receive a retaining snap ring 48.

A feature of the invention with respect to economy of construction is that instead of using left and right hand threads for operating the two engagement means 28 and 30 by the screw means 40, a single right hand thread 50 is provided and the pivoted member 36 of the engagement means 30 is formed with an internal screw thread 52 (FIG. 4) for engagement by the screw thread 50. The screw means 40 is simply journaled in the other pivoted member 34 for rotation therein without screw action. To prevent relative movement in one direction between the screw means 40 and the pivoted member 34 the screw means is provided with a fixed collar 54 in the form of a washer that is welded to the screw means. To prevent longitudinal movement of the screw means 40 in the opposite direction relative to the pivoted member 34, a nut 55 is threaded onto the screw thread 50 of the screw means. The screw thread 50 terminates adjacent the pivoted member 34 so that running the nut 55 to a limit position jams the nut against the unthreaded portion of the screw means. This limit or jambed position of the nut 55 is sufficiently spaced axially from the fixed collar 54 to permit the screw means 40 to rotate freely in the bore 35 without binding.

Each of the two engagement means 28 and 30 may be fabricated in any suitable manner, for example, by machining a block of metal or by welding together metal plates. In the construction shown in the drawings, each of the engagement means 28 and 30 is fabricated from tubular metal stock of rectangular cross-section. The stock is cut to length and then is further cut to provide a pair of slots 32 and to form the ears 42.

It is contemplated that the screw means 40 will be suitably adapted for manual rotation. In the construction shown, the end of the screw means 40 is simply bent to form a crank 56 for manual operation.

FIG. 7 indicates the manner in which the device is initially engaged with the split collar C for the purpose of installing the split collar on the confronting ends of two corrugated pipe sections. As may be seen in FIG. 7, the engagement means 28 may be first positioned with its slot 32 fitting over one of the radial flanges 15 of the split collar. The screw means 40 is then rotated by means of the crank 56 to place the second engagement means 30 with its slot 32 in substantial radial alignment with the second radial flange 15. The second engagement member 30 is then maneuvered to a position with its slot straddling and engaging the second radial flange.

With the two engagement means 28 and 30 engaging the two radial flanges 15, the crank 56 is first rotated counter-clockwise for the spreading action shown in FIG. 8. As soon as the spreading action is initiated, the two engagement means 28 and 30 are canted slightly relative to the radial flanges and are thus immobilized relative to the flanges by a binding action. The counter-clockwise rotation of the screw means 40 causes the member 36 of the engagement means 30 to travel outward along the screw thread 50 for the desired expanding or spreading operation. During this operation the pivoted member 34 of the engagement means 28 presses against the nut 45 but the nut is jambed sufficiently to resist rotation.

When the split band is spread sufficiently it is maneuvered into position encircling the confronting ends of the two corrugated pipe sections. The crank 56 is then rotated clockwise to tighten the split band 12 in the manner shown in FIG. 9. Here again the two engagement means are immobilized relative to the radial flanges by binding action involved in the tightening operation. The clockwise rotation of the screw means 40 causes the pivoted member 36 to travel along the screw thread 50 towards the engagement means 28. During this tightening operation the fixed collar 54 bears against the pivoted member 34 of the engagement means 28.

Usually the two ends of the split collar 12 must overlap in the final tightened position of the collar. It is usually necessary to pry one of the ends of the split band outward to permit the overlap. Since the crank 56 may be rotated by only one hand, the other hand of the operator is free to use a screw driver for the prying action as illustrated in FIG. 10.

When the collar is tightened to the degree required, the two radial flanges 15 of the collar are secured together by bolts 20 and nuts 22. The two engagement means 28 and 30 usually mask one of the three apertures of the two radial flanges but the other two apertures are accessible to receive the bolts and a third bolt may be installed after the tool is removed.

My description in specific detail of the selected embodiment of the invention will suggest various changes, substitutions and other departures from my disclosure within the spirit and scope of the appended claims.

I claim:

1. A tool for installing a sheet metal collar to couple together two corrugated sheet metal pipes, which collar is split longitudinally with its two adjacent ends provided with apertured longitudinally extending radial flanges, said flanges having apertures to receive screw elements for tightening the collar, said tool comprising: two elongated engagement means each having inner ends with longitudinal slots therein to straddle said flanges, respectively; two members mounted on the outer ends of said two engagement means, respectively, to swing about hinge axes relative thereto; a manually operable screw extending through said two members in screw-threaded engagement with at least one of the two members for rotation in one respect to urge the outer ends of the two engagement means away from each other thereby to cant the two engagement means relative to said flanges and away from each other to cause the two engagement means to fixedly engage the flanges and to move the flanges apart to spread the two ends of said collar, and for rotation of the screw means in the opposite respect to draw the outer ends of the two engagement means towards each other thereby to cant the two engagement means towards each other to cause the two engagement means to fixedly engage the flanges and move the flanges towards each other for tightening the collar.

2. A tool as set forth in claim 1 in which said manually operable screw means is journaled in one of said two members and is held therein against axial shift relative thereto.

3. A tool as set forth in claim 1 in which said engagement means are shaped and dimensioned to clear apertures in said flanges to permit screw elements to be inserted in the cleared apertures while the flanges are engaged by the engagement means.

4. A tool as set forth in claim 3 in which said engagement means are narrower than said flanges to clear apertures in the flanges.

5. A tool as set forth in claim 3 in which said screw is provided with a crank on one end for manual rotation thereof.

References Cited in the file of this patent

UNITED STATES PATENTS

| | | |
|---|---|---|
| 1,330,431 | De Graff | Feb. 10, 1920 |
| 1,732,789 | Cornelius | Oct. 22, 1929 |
| 2,317,195 | Husted | Apr. 20, 1943 |
| 2,599,929 | Mallasch | June 10, 1952 |
| 2,787,442 | Lewis | Apr. 17, 1957 |
| 2,816,603 | Swarthout | Dec. 17, 1957 |
| 2,886,099 | Bishman | May 12, 1959 |

FOREIGN PATENTS

| | | |
|---|---|---|
| 400,139 | Great Britain | Oct. 19, 1933 |